United States Patent [19]
Adamski et al.

[11] 3,860,651
[45] Jan. 14, 1975

[54] REDUCTIVE ALKYLATION OF AMINES
[75] Inventors: Robert J. Adamski; Satoru Numajiri, both of Fort Worth, Tex.
[73] Assignee: Alcon Laboratories, Inc., Fort Worth, Tex.
[22] Filed: May 24, 1972
[21] Appl. No.: 256,340

Related U.S. Application Data
[63] Continuation-in-part of Ser. No. 868,904, Oct. 23, 1969, abandoned.

[52] U.S. Cl. ........................... 260/570.6, 260/570 R
[51] Int. Cl. ............................................. C07c 91/22
[58] Field of Search ................................. 260/570.6

[56] References Cited
UNITED STATES PATENTS
3,284,490   11/1966   Battzily ...................... 260/570.6 X
3,452,094   6/1969    Tanz ........................... 260/570.6 X Primary Examiner—Robert V. Hines
Attorney, Agent, or Firm—Cooper, Dunham, Clark, Griffin & Moran

[57] ABSTRACT

An improved process for the production of paraproterenol and related compounds is achieved by reacting a ketone with the hydrochloride salt of an alkanol amine in the presence of hydrogen and a palladium on charcoal catalyst. In this process yields of upwards of 90 percent of the desired product are obtained in which the labile hydroxyl groups are preserved. Specifically, an improved process for the manufacture of 1-(4-hydroxyphenyl)-2-isopropylaminoethanol hydrochloride, also known as paraproterenol, is provided by reacting dl-1-(4-hydroxyphenyl)-2-amino ethanol hydrochloride and acetone at a temperature of about 40° C. in the presence of gaseous hydrogen and 5 percent palladium on charcoal as the hydrogenation catalyst. Yields of 92 percent were obtained in which the hydroxyl group adjacent to the phenyl ring remained intact.

1 Claim, No Drawings

REDUCTIVE ALKYLATION OF AMINES

This application is a continuation-in-part of copending application Ser. No. 868,904 filed Oct. 23, 1969 and now abandoned. The disclosures of application Ser. No. 868,904 are herein incorporated and made part of this disclosure.

There is disclosed herein a reductive alkylation process useful for the preparation of compounds disclosed in coassigned patent application Ser. No. 830,109 filed June 3, 1969 in the name of Floyd E. leaders, Jr. entitled "Compositions and Method Employing the Same for the Treatment of Intraocular Hypertension," now abandoned, and in copending, coassigned application Ser. No. 220,464 filed Jan. 24, 1972, also in the name of Floyd E. Leaders, Jr. The disclosures of the above-identified applications are herein incorporated and made a part of this disclosure.

This invention relates to an improved process for the reductive alkylation of an amino alcohol. More particularly, this invention relates to an improved process for the reductive alkylation of the acid salt, such as the hydrochloride salt, of an aryl or alkyl substituted amino alcohol. Still more particularly, this invention relates to an improved process for the reductive alkylation of the hydrochloride salt of a hydroxyphenyl amino ethanol. In all the above reactions the alkylative reduction is with a ketone in the presence of hydrogen and a palladium on charcoal catalyst.

In pharmacology it is well known that the hydroxyl group, such as the one adjacent the phenyl ring in paraproterenol, is the group which gives the compound its pharmacological property. Accordingly, this group is often referred to as being pharmacophoric. It is also well-known that this group is very labile, i.e., it readily undergoes attack in the presence of mineral acids. In other situations it can become etherified or it can undergo solvolysis. In any of these events, the pharmacological property of the compound is lost. Attempts have often been made to produce paraproterenol and related compounds by proceeding through the steps of normal text-book chemistry. These steps normally consist of dissolving a starting compound such as dl-1-(4-hydroxyphenyl)-2-amino ethanol in an aqueous solution of hydrochloric acid, ethanol and acetone or other and related compounds under various conditions under which the acetone becomes reduced and the amino group becomes alkylated. In these attempts, however, the pharmacophoric hydroxyl group can undergo solvolysis or etherification and a great reduction in yield can result of even a non-pharmacophoric compound.

The present invention, on the other hand, provides a simple and direct process for producing pharmacologically active compounds at unexpectedly high yields. The starting compound is introduced into its reaction mixture in the form of its acid salt, such as its hydrochloride salt. No water is present for ionization of the salt, yet reaction occurs in the medium which is made up of an alcohol and a ketone.

While it has not been completely ascertained as to how the reaction proceeds, it is postulated that the starting compound affixes itself to the palladium on charcoal catalyst and then as reduction of the ketone occurs it produces a final compound having solubility in the alcohol medium wherein the hydrochloride has remained non-ionized throughout the reaction and therefore could not attack the hydroxyl group or promote attack on it by other ingredients in the reaction mixture. Even by this postulated explanation of the process, the high yields obtained are unexpected.

A typical reductive alkylation reaction to which the practice of this invention is applicable is as follows:

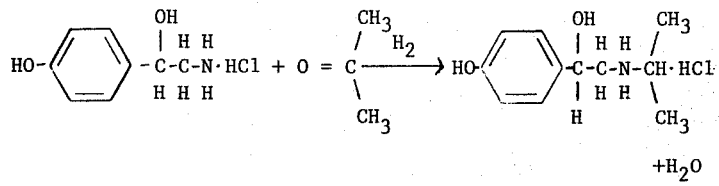

Various techniques involving reduction alkylation of an amine with a ketone are known. Many of these are described in textbooks and other publications on chemistry and its reactions. Some U.S. Pats. also describe various amineketone alkylative reductions. These include U.S. Pat. Nos. 2,359,707; 2,625,566; 2,674,624; 2,930,731; 3,155,726; 3,188,349; 3,202,711; 3,215,732; 3,225,098; 3,262,977; 3,284,490; 3,341,593; 3,452,094; 2,151,459; and 2,776,993. The present invention, however, differs from the teachings of the prior art since no mention is made in the prior art of a reaction involving the hydrochloride salt of an alkanol amine as the starting compound in a reaction mixture devoid of water or other ionizing influence. The present invention has as an object the preparation of a compound having its labile hydroxyl groups intact after alkylative reduction with a ketone.

In accordance with one practice of this invention the following procedure was followed: dl-1-(4-hydroxyphenyl)-2-amino ethanol hydrochloride was dissolved in anhydrous ethanol and acetone at a temperature of approximately 40° C. This hot ethanolic solution had carefully added to it the palladium on charcoal catalyst and was at once hydrogenated under 50 psig of hydrogen. The reaction bottle was shaken for approximately 18 hours at 40° C. The reaction was completed when additional hydrogen was not consumed.

When the reaction was completed, the catalyst was removed from the resulting mixture by filtration and the ethanol was removed by distillation from the filtrate under reduced pressure. The resulting residue, which was 1-(4-hydroxyphenyl)-2-isopropylamino ethanol hydrochloride, was dissolved in methanol and crystallized therefrom by the addition of ethyl ether. The product yield by this procedure was 92 percent.

In this procedure heat is required to make the reaction go. For example, it was found that a temperature of about 35° C. was an acceptable minimum. However, a higher temperature provided better performance of the reaction. For example, a temperature in the range from about 40° C. to about 60° C. was preferred. Even more preferred was a temperature in the range from about 45° C. to about 55° C.

The temperature factor is believed to be related to the solubility of the starting hydrochloride compound in the reaction medium. It should be recalled that water is absent from the reaction medium. If water is added to aid in the dissolution of the hydrochloride starting compound, the reaction would fail to go higher than approximately 10 percent completion. It is possible that the palladium on charcoal catalyst has a relationship to this temperature requirement and to the overall reaction process. It has been found, for example, that other catalysts sich as platinum, platinum oxide, and others do not provide a reaction which produces the desired product in high yield and having labile hydroxyl group(s) unaffected.

The ketone or carbonyl moiety employed in the reductive alkylation process in accordance with this invention may be substantially any alkyl, cycloalkyl or alkyl aryl ketone. Illustrative of the alkyl ketones useful in the practice of this invention are those ketones which contain up to about a total of 20 carbon atoms per molecule or those alkyl ketones wherein the alkyl group contains from 1 to about 7 carbon atoms. Suitable such alkyl ketones include acetone, diethyl ketone, methyl ethyl ketone, methyl n-propyl ketone, methyl isopropyl ketone, methyl isobutyl ketone, ethyl isobutyl ketone, methyl n-hexyl ketone. Suitable alicyclic or cycloalkyl ketones useful in accordance with this invention include cyclohexanone, cyclopentanone, the alkyl substituted cyclohexanones, for example, the $C_1$–$C_6$ alkyl substituted cyclohexanones, e.g., methyl cyclohexanone. The alkyl aryl ketones, including methyl phenyl ketone, particularly those alkyl aryl ketones containing one or more substituent alkyl groups in the aryl group wherein the substituent alkyl group has a carbon atom content in the range from about 1 to about 6 carbon atoms, are also useful in the practice of this invention. Suitable aromatic or arylketones useful in the reductive alkylation process in accordance with this invention include benzophenone, benzil, including the unsaturated ketones and hydroxy-substituted aromatic ketones, such as benzalacetophenone, dicinnamylideneacetone, p-hydroxyacetophenone, O-hydroxy-acetophenone, resacetophenone, paeonol, apocynin and zingerone.

The following are examples of the practices of this invention:

EXAMPLE NO. 1

Preparation of 1-(4-hydroxyphenyl)-2-isopropylaminoethanol hydrochloride (IHPEA)

One-tenth mol (18.69 grams) of dl-1-(4-hydroxyphenyl)-2-aminoethanol hydrochloride was suspended in a mixture made up of 200 ml of anhydrous ethanol and 70 ml of acetone and warmed in a steam bath until dissolved. To the resulting warm solution there were added 2.0 grams hydrogenation catalyst made of 5 percent by weight of palladium on charcoal. The resulting mixture was hydrogenated at a temperature of about 40° C. at a hydrogen pressure of about 50 psig for 18 hours. The hydrogenation catalyst was removed from the resulting mixture by filtration and the solvent (ethanol) was removed by distillation from the filtrate under a reduced pressure. The resulting residue containing reaction product was dissolved in methanol and crystallized therefrom by the addition of ethyl ether. There was obtained as product 0.092 mol of IHPEA (21.3 grams), yield of 92 percent.

EXAMPLE NO. 2

Preparation of l-1-phenyl-2-isopropylamino-ethanol hydrochloride l-1-phenyl-2-amino-ethanol hydrochloride in the amount of 2.42 grams (0.015 mol) was dissolved in 42 ml of anhydrous ethanol and 15 ml of acetone. Palladium on charcoal (5 percent palladium) in the amount of 0.5 gram was added and the resulting reaction mixture was heated to 50° C. and shaken overnight under pressure of about 50 psig of hydrogen. The catalyst was then removed by filtration from the resulting reaction mixture and the solvent was removed by distillation under reduced pressure. The resulting residue was recrystallized from a mixture of methanol and ethyl ether and there was obtained the desired product l-1-phenyl-2-isopropylamino ethanol hydrochloride in the form of a white crystalline material in the amount of 2.7 grams, a 91 percent yield.

EXAMPLE NO. 3

Preparation of 1-(4-hydroxyphenyl)-2-cyclohexyl-amino-ethanol hydrochloride 1-(4-hydroxyphenyl)-2-amino-ethanol hydrochloride in the amount of 2.0 grams (0.011 mol) was dissolved in 40 ml of anhydrous ethanol and 4 ml of cyclohexanone. The resulting solution was hydrogenated under conditions set forth hereinabove with respect to the previous examples employing palladium on charcoal (5 percent) as the hydrogenation catalyst. After removal of the catalyst from the resulting reaction mixture, the solvent was removed by distillation under reduced pressure and the resulting residue was shaken with ether until a fine white powder was formed. This material was collected by filtration, washed with ether, and air-dried. There was recovered as product 1(4-hydroxyphenyl)-2-cyclohexylamino-ethanol hydrochloride in the amount of 2.85 grams, a 97.2 percent yield.

EXAMPLE NO. 4

Preparation of 1-phenyl-2-isopropyl-amino-propanol hydrochloride

Following the procedure of Example No. 2, 4.69 grams (0.025 mol) of 1-phenyl-2-amino-propanol hydrochloride were reacted. There was recovered the desired product 1-phenyl-2-isopropylaminopropanol hydrochloride in the amount of 5.5 grams, a 96.5 percent yield.

EXAMPLE NO. 5

Preparation of 1-(3-hydroxphenyl)-2-isopropyl-amino-ethanol hydrochloride

Following the procedure of Example No. 2, 4.75 grams (0.025 mol) of 1-(3-hydroxyphenyl)-2-amino-ethanol hydrochloride were reacted. There were recovered the desired product 1-(3-hydroxyphenyl)-2-isopropyl-amino-ethanol hydrochloride.

Other compounds which are prepared in accordance with the practices of this invention include 1-(3,4-dihydroxyphenyl)-2-isopropylamino-ethanol hydrochloride (ISOPROTERENOL), 1-(2,4-dihydroxyphenyl)-2-isopropyl-amino-ethanol hydrochloride (META PROTERENOL), 1-(4-nitrophenyl)-2-isopropylamino-ethanol hydrochloride (INPEA), and 1-(4-hydroxyphenyl)-2-(1-methyl-2-phenoxyethylamine)-propanol hydrochloride (ISOXUPRINE). Numerous other compounds are prepared by employing the reductive alkylation process in accordance with this invention, i.e. carrying out the reductive alkylation of the amine in the form of its acid salt, e.g., hydrochloride, or other, preferably pharmacologically acceptable acid salt, in the presence of a ketone and hydrogenation catalyst made of a minor amount by weight (in the range of 1 to 10 percent by weight) of palladium on charcoal.

As indicated hereinabove, the practices of this invention are applicable to the reductive alkylation of such compounds as mono-, di-, and tri-substituted 1-phenyl- 2-amino-propanols and 1-phenyl-2-amino-ethanols. The practices of this invention are particularly applicable to the preparation of N-substituted monocyclic aryl-, polycyclic aryl-, and heterocyclic-2-amino-propanol and -2-amino-ethanol compounds. The above compounds all have extremely labile hydroxyl groups adjacent to the aromatic ring or component. The practices of this invention permit the rapid reduction alkylation of these compounds to be carried out without an undue danger of labile hydroxyl group attack or ring reduction and moreover reductive alkylation to produce the desired compounds at high yields.

As will be apparent to those skilled in the art in the light of the accompanying disclosure many modifications, alterations, and substitutions are possible in the practice of this invention without departing from the spirit or scope thereof.

We claim:
1. A catalytic hydrogenation process for the reductive alkylation of an alcohol amine selected from the group consisting of 1-(4-hydroxyphenyl)-2-amino ethanol and 1-(3-hydroxyphenyl)-2-amino ethanol, said alcohol amine being in the form of its hydrochloride salt, which comprises dissolving the hydrochloride salt of said alcohol amine in an anhydrous organic solvent and reacting said hydrochloride salt of said alcohol amine in a reaction medium made up of said salt and said anhydrous organic solvent and a ketone selected from the group consisting of acetone and cyclohexanone and in the absence of water at a temperature in the range from about 30°C. to about 60°C. in the presence of gaseous hydrogen at a pressure of about 50 psig and a catalyst consisting essentially of palladium on charcoal.

* * * * *